United States Patent [19]

Sharp, Jr.

[11] Patent Number: 4,648,112
[45] Date of Patent: Mar. 3, 1987

[54] DESK/WALL MOUNTED TELEPHONE SUBSET

[75] Inventor: James M. Sharp, Jr., Corinth, Miss.

[73] Assignee: ITT Corporation, New York, N.Y.

[21] Appl. No.: 780,358

[22] Filed: Sep. 26, 1985

[51] Int. Cl.[4] .................. H04M 1/02; H04M 1/04; H04M 1/06
[52] U.S. Cl. .................................... 379/435; 379/426
[58] Field of Search ........... 179/100 C, 100 R, 100 D, 179/101, 102, 103, 146 R, 148 R, 148 F, 149, 150, 153, 158 R, 163, 178, 151, 152

[56] References Cited

U.S. PATENT DOCUMENTS

| | | | |
|---|---|---|---|
| 2,076,244 | 4/1937 | McLarn | 179/147 |
| 2,199,686 | 5/1940 | Beyland | 179/100 C |
| 2,492,375 | 12/1949 | Boswau et al. | 179/100 C |
| 3,818,150 | 6/1974 | Kunimine | 179/100 C |

FOREIGN PATENT DOCUMENTS

| | | | |
|---|---|---|---|
| 350116 | 3/1922 | Fed. Rep. of Germany | 179/100 C |
| 804579 | 4/1951 | Fed. Rep. of Germany | 179/100 C |

Primary Examiner—Gene Z. Rubinson
Assistant Examiner—Danita R. Byrd
Attorney, Agent, or Firm—John T. O'Halloran; Thomas F. Meagher

[57] ABSTRACT

A telephone subset with a desk and wall mount capability employs an east-to-west oriented handset. The subset base has a bearing at a first axis on which the subset housing pivots. The base has slots for the tabs of a bracket to engage and hold the subset in the desk or wall positions. The housing provides a cylindrical well in which a spring loaded pin is mounted, and also provides surfaces on which the subset handset cradle, which houses the hookswitch, rests in the desk and wall configurations. To prevent the bracket from translating, the spring loaded pin engages a hole in the bracket. As the pin is depressed, it disengages the hole and allows the smaller diameter section of the pin to enter the slot so the bracket can translate. The bracket provides an axle on which the cradle mounts, forming a pivot at a second axis, for pivoting from a desk position to a wall position.

16 Claims, 15 Drawing Figures

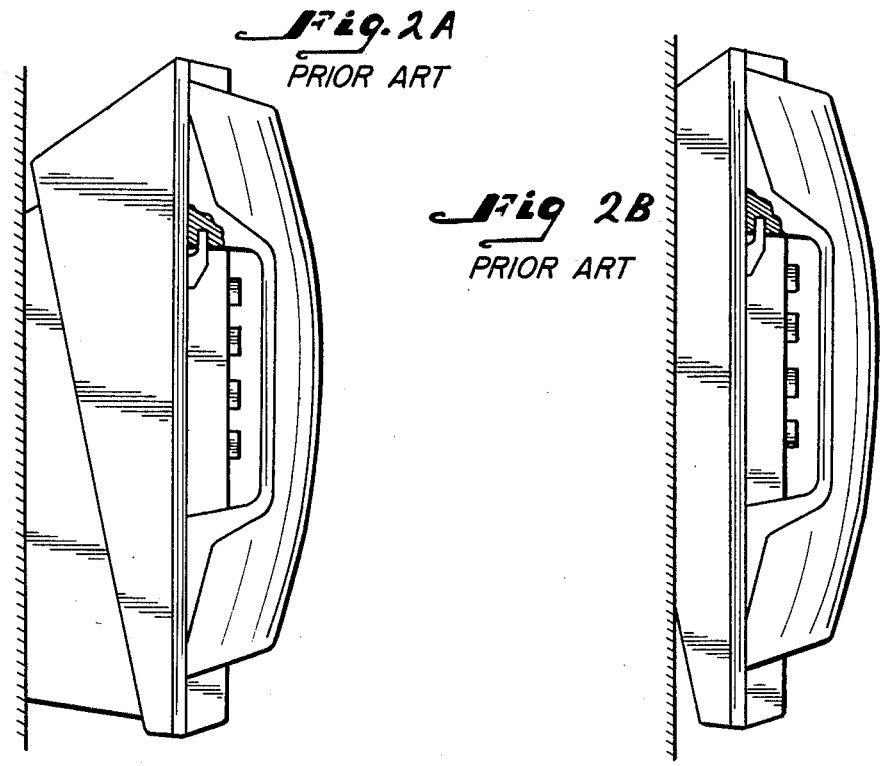
Fig. 2A PRIOR ART
Fig 2B PRIOR ART
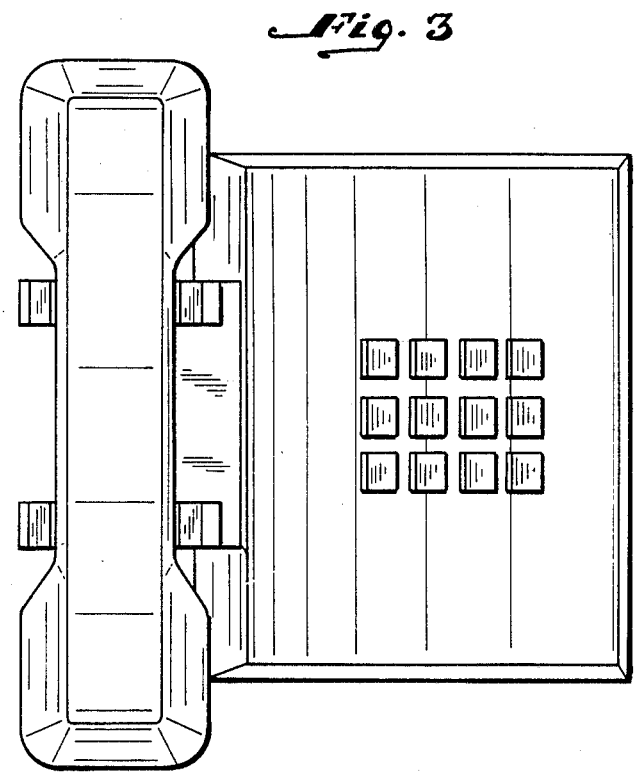
Fig. 3

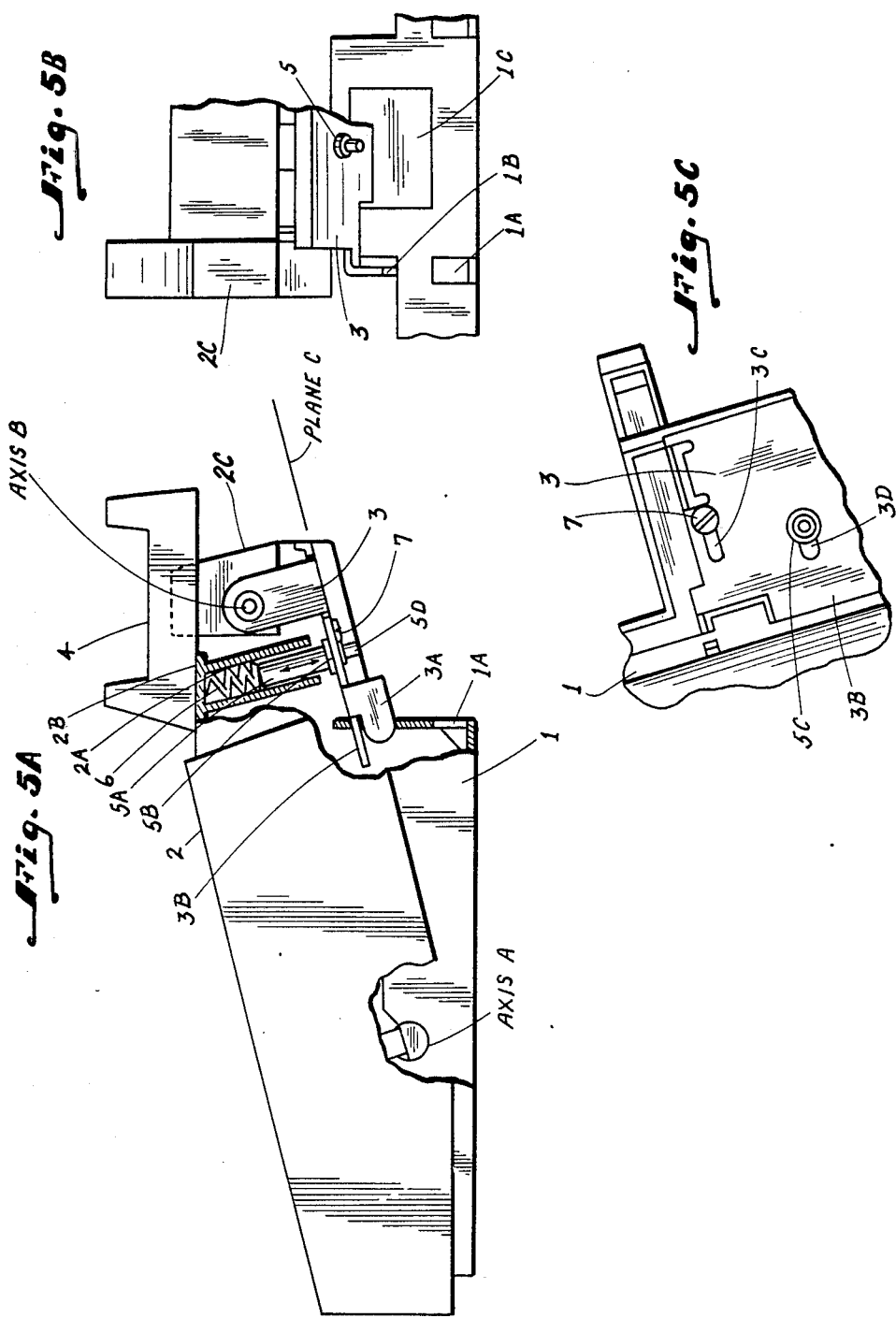

DESK/WALL MOUNTED TELEPHONE SUBSET

BACKGROUND OF THE INVENTION

1. Field of the Invention

The invention relates to a telephone subset which has a desk and wall mount capability.

2. Description of the Prior Art

Telephone subsets that combine desk and wall mount capability are known which position the handset in a north-to-south direction on the subset base, as shown in FIG. 1. It is necessary, in order to be able to change a subset of this type from desk to wall mount position, that the subset employ a hook-like tab which is mounted to the cradle area of the subset, as shown in FIG. 2, and engages a recessed area on the handset to hold the handset vertically as required. Such subsets require the plane of the dial buttons to be positioned parallel with the wall. To accomplish this parallel wall position, a wedge shaped part is attached to the bottom of the subset as shown in FIG. 2A. The ITT EKS-801 subset sold by ITT Corporation uses this arrangement for wall mounting. In other applications, such as the Panasonic KX-T2010 subset shown in FIGS. 1B and 2B, a leg is hinged back to accommodate wall mounting.

A disadvantage of this type of combination desk/wall subsets is that additional parts, usually in the form of an extra cost kit, must be purchased to convert from desk to wall mount. If parts are provided initially for wall mount conversion, and are not used, the user must store these in case he has need later on to convert the desk unit to a wall unit. Another disadvantage is that the necessary additional parts increase the cost of having wall mount capability. Yet another disadvantage is that special instructions are required as well as tools to convert a subset, which may prevent users from changing their subset.

Other known types of combination desk/wall subsets have the handset in an east-to-west direction on the subset base, as shown in U.S. Pat. Nos. 2,076,244 (to E. S. McLarn), 2,492,375 (to H. P. Boswau et al.), and 2,199,686 (to S. A Beyland), as well as in Great Britain Patent Specification No. 738,714 (published Oct. 19, 1955, of W. Sinclair). The former two references disclose sets which require rotation of the dial, while the latter two references disclose sets which require removal and repositioning of the cradle.

SUMMARY OF THE INVENTION

A telephone subset embodying the invention has a desk and wall mount capability and employs an east-to-west oriented handset. The subset base has a bearing at a first axis on which the subset housing pivots. The base has slots for the tabs of a bracket to engage and hold the subset in the desk or wall positions. The housing provides a cylindrical well in which a spring loaded pin is mounted, and also provides surfaces on which the subset handset cradle, which houses the hookswitch, rests in the desk and wall configurations. To prevent the bracket from translating, the spring loaded pin engages a hole in the bracket. As the pin is depressed, it disengages the hole and allows the smaller diameter section of the pin to enter the slot so the bracket can translate. The bracket provides an axle on which the cradle mounts, forming a pivot at a second axis, for pivoting from a desk position to a wall position.

The invention provides an east-to-west handset position for both desk and wall configurations, which provides different styling opportunities, as shown in FIGS. 3 and 4. No additional parts are required with the invention for the user to purchase or store, and no tools are required to convert from desk to wall mount configuration. The user of the invention can easily and quickly convert from desk-to-wall or wall-to-desk configurations as the user's needs change.

BRIEF DESCRIPTION OF THE DRAWINGS

The invention may be better understood from a reading of the following detailed description in conjunction with the drawings in which:

FIGS. 1A and 1B, and 2A and 2B show two known desk/wall subsets in desk and wall positions, respectively.

FIGS. 3 and 4 show a subset embodying the invention in desk and wall positions, respectively.

FIGS. 5A, 5B, and 5C show in detail a subset embodying the invention.

DESCRIPTION OF THE PREFERRED EMBODIMENTS

Figure 1C:
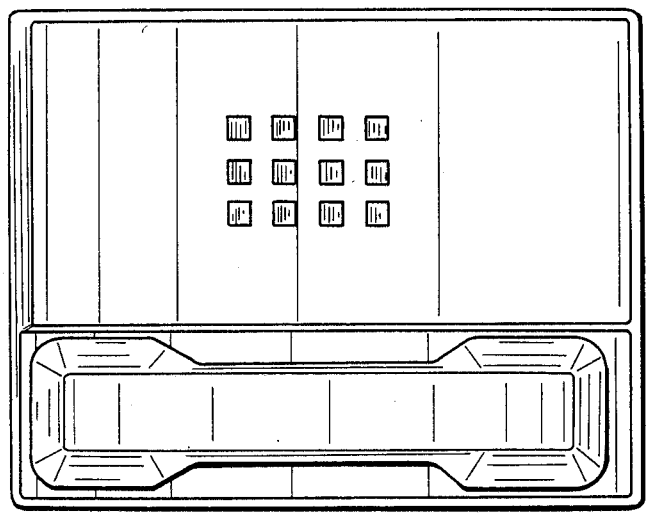
FIG. 1C shows a top view of both of the aforementioned known desk/wall subsets.
Figure 1A:
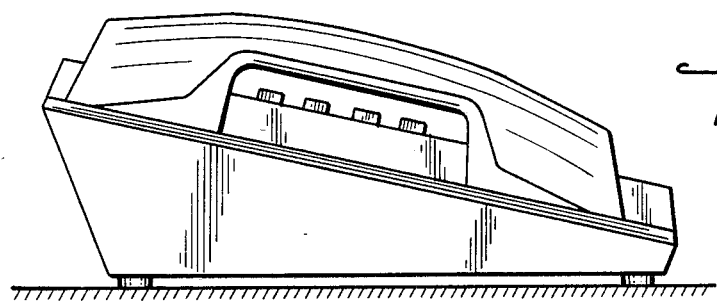
Figure 1B:
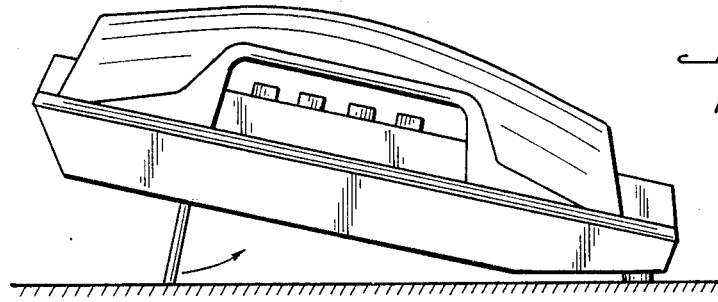
Figure 4:
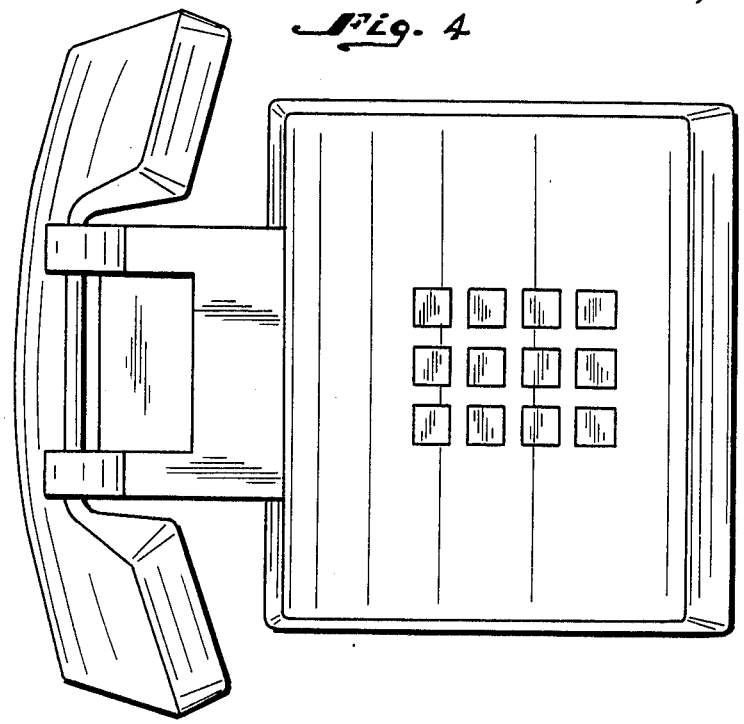
Figure 6:
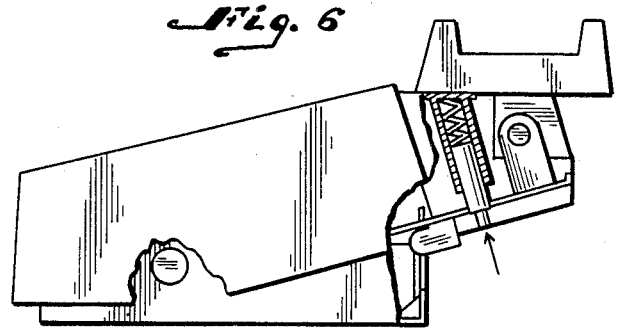
FIGS. 6, 7, 8, 9, and 10 show a subset embodying the invention during the sequence of operations to convert the subset from the desk position to the wall position.
Figure 10:
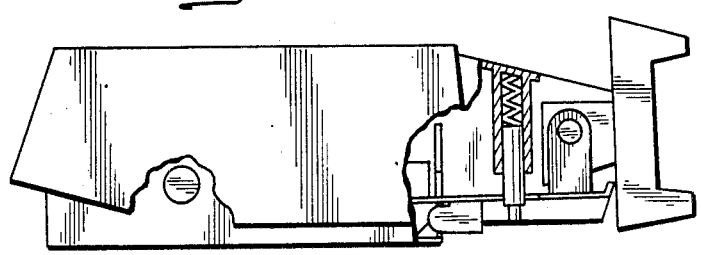

Components and features of the invention are shown in FIGS. 5A, 5B, and 5C. Subset base 1, composed of, for example, stamped metal, has a bottom surface which contains the same features used in known wall subsets which are required to mount to a standard FCC wall plate jack. The base has a bearing at axis A on which the subset housing 2 pivots. The base has slots 1A and 1B for the tabs 3A of a bracket 3 to engage and hold the subset in the desk or wall positions, as shown in FIGS. 6 and 10. The base has a rectangular opening 1C for the tongue 3B of the bracket to fit into, and functions as a guide that prevents side-to-side motion of the base and housing. The opening also functions as a stop to limit up and down motion of the housing assembly as it pivots around axis A in going from desk to wall positions.

Subset housing 2, composed of, for example, molded plastic, supports functional components such as the dial and the printed circuit board assemblies. The housing provides a mounting for a metal axle at axis A which mates with the bearing in the base. The housing provides a cylindrical well in which a spring 6 and a pin 5 are mounted. The housing provides bosses for screws 7 to mount and secure the bracket 3 against ribs molded into the housing, thus allowing the bracket to translate along plane C. The housing also provides surface 2B on which subset cradle 4 rests in the desk configuration, and provides surface 2C on which the cradle rests in the wall configuration, as shown in FIG. 10.

Subset bracket 3, composed of, for example, stamped metal, is attached to the housing by two screws 7 which pass through slotted holes 3C, thus allowing the bracket to translate along plane C. Two tabs 3A engage slots 1A or 1B on the base and lock the subset in the desk or wall position, respectively. A tongue 3B engages a slot 1C to prevent side-to-side motion of the housing on the base and limits up and down motion of the housing as it rotates at axis A of the base. To prevent the bracket from translating along plane C, a spring loaded pin, comprising spring 6 and pin 5, engages a hole 3D in the bracket. As the pin is depressed, it disengages the hole and allows the smaller diameter section 5D of the pin to enter the slot at 3D so the bracket can translate along plane C. This slot also limits the travel of the bracket. The bracket provides an axle on which the cradle mounts, forming a pviot at axis B.

Subset cradle 4, composed of, for example, molded plastic, is employed as a holder for the handset to rest on in a horizontal position. The cradle houses the hookswitch and its related parts, and forms a bearing with the bracket at axis B for pivoting from a horizontal, or desk position to a vertical, or wall position. The cradle also provides a bottom surface for resting on surface 2B of the housing in the desk position, or surface 2C in the wall position.

Pin 5 is comprised of several sections of different diameters. Pin section 5A holds the compression spring 6 in the well 2A, and forms a sliding bearing within the well. Pin section 5B forms a stop that holds the pin and spring in the housing. Pin section 5C has a diameter that allows it to mate with the hole at 3D and lock the bracket in position. Pin section 5D has a smaller diameter than pin section 5C so that when the pin is depressed it can engage the slot at 3D and allow the bracket to slide.

Figure 7:
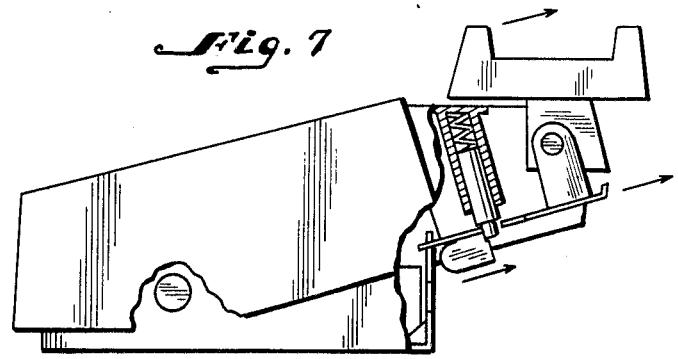
Figure 8:
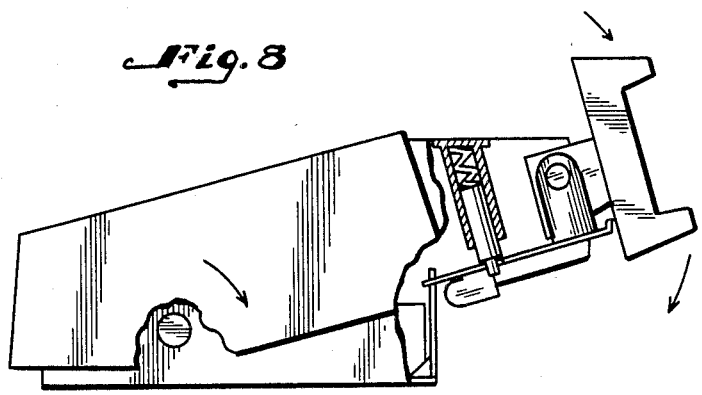
Figure 9:
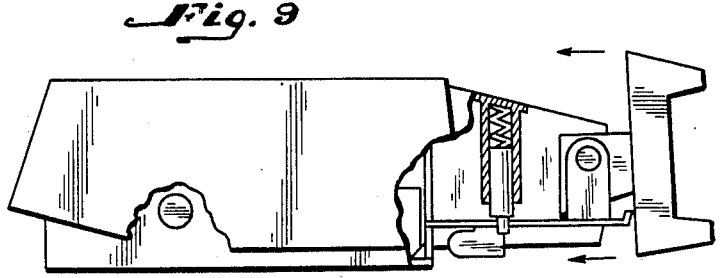

The sequence of operations to convert the subset from the desk position to the wall position is shown in FIGS. 6 to 10. As shown in FIG. 6, the pin 5 is depressed, that is, pushed upwardly, and is held in this position while the cradle and bracket are translated outwardly, that is, pulled to the right, as shown in FIG. 7. This translation forces the cradle upward and off of the housing surface 2B and disengages the tab 3A from slot 1B in the base. As shown in FIG. 8, the cradle and the housing are then rotated clockwise, that is, downwardly, around their respective axes. As shown in FIG. 9, the housing is rotated downwardly until the tongue 3B stops against the bottom of the slot 1C on the base. As the cradle and bracket are translated inwardly, that is, to the left, the tab 3A engages the slot 1A in the base. Engagement is completed and the subset is locked into the wall configuration when the spring loaded pin 5 snaps back into hole 3D. At the same time, the bottom of the cradle rests against surface 2C of the housing. The subset is now ready for wall mounting. The above procedure is reversed to convert the subset from wall position to the desk position.

This combination desk/wall subset has its primary application in single and multi-line telephone units. It could have use in other communications equipment, such as in an intercom unit.

While the present invention has been described in connection with a preferred embodiment thereof, it is to be understood that additional embodiments, modifications, and applications which will become obvious to those skilled in the art are included within the spirit and scope of the invention as set forth by the claims appended hereto.

I claim:

1. A telephone subset comprising,
    a subset housing;
    a hookswitch cradle; and
    a bracket, mounted to said cradle in a pivotal relationship, and translatorily mounted to said housing, wherein said cradle has a cradle resting position varied from a first surface portion of said housing to a second surface portion of said housing.

2. A telephone subset according to claim 1, further comprising:
    a subset base, mounted to said housing in a pivotal relationship wherein said housing has a housing resting position varied from a first position parallel to said base to a second position at an acure angle to said base, whereby said cradle is varied, simultaneously with said housing resting positions, from its first cradle resting position to its second cradle resting position.

3. A telephone subset according to claim 2, wherein said bracket is formed with at least one tab for engagement with first and second slots of said base, for locking said housing into either of said first and second housing resting positions, respectively.

4. A telephone subset according to claim 1, further comprising:
    a spring mounted pin having an inner end and an outer end, said inner end mounted in said housing and said outer end protuding into a opening of said bracket, whereby translation of the bracket occurs when the pin is in a depressed position and translation of the bracket is prevented when the pin is in a rest position.

5. A telephone subset according to claim 4, wherein said pin is composed of a plurality of sections of different diameters, comprising at least four sections, including the inner end, the outer end, a section adjacent to the inner end and a section adjacent to the outer end.

6. A telephone subset according to claim 5, wherein the outer end of said pin has a first diameter whereby translation of said pin in said pin depressed position occurs within a slot portion of said bracket opening, and wherein the section adjacent to said outermost section has a second diameter, larger than said first diameter, whereby locking of said pin in said pin rest position occurs within a hole portion of said bracket opening.

7. A telephone subset comprising,
    a subset housing;
    a handset cradle, mounted on a surface of said subset housing; and
    a bracket, having two ends, said bracket mounted to said cradle in a pivotal relationship, and translatorily mounted to said housing, so that said cradle has a cradle resting position varied from a first surface portion of said housing to a second surface portion of said housing.

8. A telephone subset according to claim 7, further comprising:
    a subset base, mounted to said housing in a pivotal relationship, wherein said housing may have a housing resting position varied from a first position parallel to said base to a second position at an acute angle to said base, whereby said cradle is varied, simultaneously with said housing resting positions, from its first cradle resting position to its second cradle resting position.

9. A telephone subset according to claim 8, wherein said base has an opening, and one end of said bracket protrudes in the opening in said base to prevent side-to-side motion of said base relative to said housing and to limit up and down motion of said housing relative to said base.

10. A telephone subset according to claim 8, wherein said bracket is formed with at least one tab for engagement with first and second slots of said base, for locking said housing into either of said first and second housing resting positions, respectively.

11. A telephone subset according to claim 7, further comprising:
a spring mounted pin having an inner end and an outer end, said pin having its inner end mounted in a cylindrical well of said housing and having its outer end protuding into an opening of said bracket, whereby translation of said bracket relative to said housing occurs when the pin is in a depressed position, and translation of said bracket is prevented when the pin is in a rest position.

12. A telephone subset according to claim 11,
wherein said pin is composed of a plurality of sections of different diameters, comprising at least four sections, including the inner end, the outer end, a section adjacent to the inner end and a section adjacent to the outer end.

13. A telephone subset according to claim 12,
wherein the outer end of said pin has a first diameter whereby translation of said pin in said pin depressed position occurs within a slot portion of said bracket opening, and wherein the section adjacent to said outermost section has a second diameter, larger than said first diameter, whereby locking of said pin in said pin rest position occurs within a hole portion of said bracket opening.

14. A telephone subset according to claim 12, further comprising:
a compression spring, mounted in said cylindrical well, wherein the inner end of the pin protrudes through said spring to form a sliding bearing within said cylindrical well, and wherein the section adjacent to said inner end has a diameter larger than the diameter of the inner end and larger than the diameter of said bracket opening to form a stop which holds said spring and said pin in said cylindrical well.

15. A telephone subset according to claim 7, further comprising;
a screw, coupling said bracket to said housing, wherein said screw protrudes through a slot to allow translation of said bracket relative to said housing.

16. A telephone subset comprising,
a subset housing; and
a bracket, mounted to a hookswitch cradle in a pivotal relationship, and translatorily mounted to said housing, so that said bracket may be translated from a bracket rest position to a bracket rotation position allowing rotation of said cradle, wherein said cradle may have a cradle resting position varied from a first surface portion of said housing to a second surface portion of said housing.

* * * * *